J. A. WULFTANGE.
SIFTER.
APPLICATION FILED DEC. 13, 1912.
1,071,379.
Patented Aug. 26, 1913.
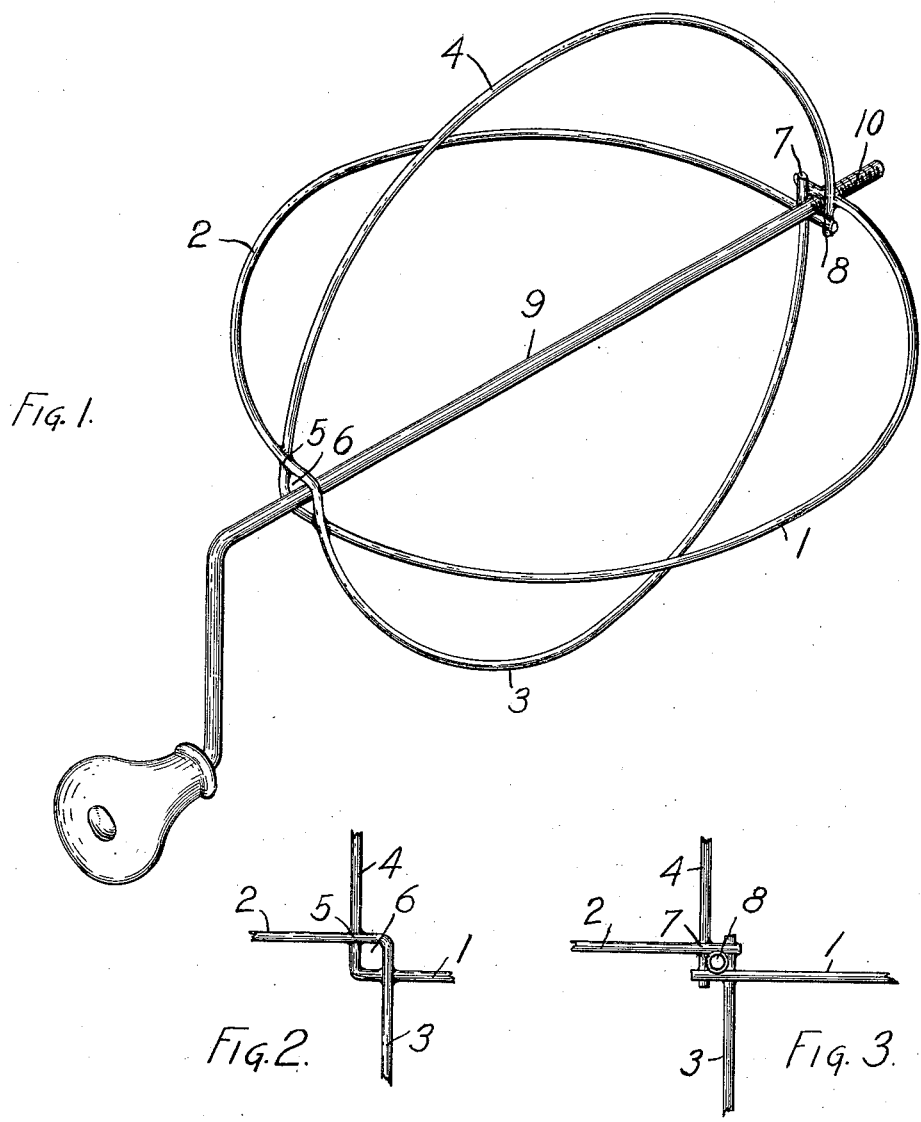
Witnesses:
Elmer R. Shipley
Geo. Johnson
John A. Wulftange
Inventor
by James W. See
Attorney

UNITED STATES PATENT OFFICE.

JOHN A. WULFTANGE, OF HAMILTON, OHIO, ASSIGNOR TO THE FRED J. MEYERS MANUFACTURING COMPANY, OF HAMILTON, OHIO.

SIFTER.

1,071,379.  Specification of Letters Patent.  Patented Aug. 26, 1913.

Application filed December 13, 1912. Serial No. 736,456.

*To all whom it may concern:*

Be it known that I, JOHN A. WULFTANGE, a citizen of the United States, residing at Hamilton, Butler county, Ohio, have invented certain new and useful Improvements in Sifters, of which the following is a specification.

There is a class of small domestic flour sifters consisting of a round vessel having at least its base portion formed of fine wire cloth, this base portion being often of hemispherical form. Diametrically across the vessel is arranged a spindle journaled in the wall of the vessel and provided with an exterior hand-crank. On this spindle is arranged a number of wings extending radially from the spindle and formed of bowed wires intersecting each other and secured to the spindle just within the walls of the vessel. The bows of the wings act as agitators and sweep within the hemispherical base of the vessel. This class of domestic sifters is well known and my present invention relates to improvements in the joining of the wires of the agitator to each other and the joining of them to the spindle.

My invention will be readily understood from the following description taken in connection with the accompanying drawing in which:—

Figure 1 is a perspective view of the spindle in conjunction with the improved agitator; Fig. 2 an elevation of the intersecting agitator wires engaging that portion of the spindle near the crank; and Fig. 3 an elevation of the intersection of the agitator wires where they engage that portion of the spindle farthest from the crank.

In the drawing: 1, indicates one of the side wings of the agitator, the same being in the form of a semi-circularly bowed wire with portions crossing the spindle; 2, the opposite similar side wing of the agitator; 3, the third similar wing similarly related to the spindle and disposed in a plane at right angles to the plane of wings 1 and 2; 4, a similar agitator wing disposed opposite wing 3; 5, the intersections of the wing-wires at the portion of the agitator nearest the crank; 6, an aperture formed by the wing-wires where they pass the spindle near the crank, this aperture being large enough to freely admit the passage of the spindle; 7, the intersections of the wing-wires where they pass the spindle at its portion farthest from the crank; 8, an aperture formed by the wires passing the spindle at the intersections 7, this aperture being smaller than the body of the spindle and being threaded; 9, the spindle; and 10, the threaded end of the spindle, farthest from the crank, and screwing into the aperture 8.

I have illustrated the agitator as being formed of two wires, one wire forming the wings 1 and 4, while the other wire forms the wings 2 and 3, these wires presenting two intersections at the aperture 6 and four intersections at the aperture 8.

In constructing the agitator, after its wires have been bent up to form and properly positioned relative to each other, the intersections 5 are electrically welded, aperture 6 being left large enough to freely admit the body of the spindle. Intersections 7 are also electrically welded, the wires being so related to each other as to produce at 8 an aperture smaller than the body of the spindle. Aperture 8 is then tapped to form a thread in the tangentially disposed wires forming the aperture 8, and into this threaded aperture is screwed the threaded portion of the spindle, the threaded engagement thus being formed by the metal of the spindle and the metal of the wires.

I claim:—

A beater for sifters, comprising a cranked spindle screw-threaded at one end, two beater wires each comprising two approximately semi-circular portions, the said portions being bent at an angle to each other, each of said wires having two free ends, the free ends of said two wires being overlapped and fixed together to form an aperture engaging said screw-thread, the said wires opposite said free ends being also fixed together to form an aperture embracing the spindle.

JOHN A. WULFTANGE.

Witnesses:
J. PAUL SCUDDER,
M. S. BELDEN.

Copies of this patent may be obtained for five cents each, by addressing the "Commissioner of Patents, Washington, D. C."